United States Patent [19]

Evans et al.

[11] 4,017,654
[45] Apr. 12, 1977

[54] CURED RUBBER ARTICLE AND METHOD OF PREPARATION

[75] Inventors: Theodore A. Evans; William A. Watts, both of Uniontown, Ohio

[73] Assignee: The Goodyear Tire & Rubber Company, Akron, Ohio

[22] Filed: Feb. 6, 1976

[21] Appl. No.: 655,818

[52] U.S. Cl. .............................. 428/40; 152/330 R; 156/123; 156/289; 428/352

[51] Int. Cl.$^2$ ......................................... B32B 31/00

[58] Field of Search ............ 156/96, 110 R, 123 R, 156/126–129, 289; 428/40, 494, 515, 518, 520, 523, 352; 152/330

[56] References Cited

UNITED STATES PATENTS

| 2,051,849 | 8/1936 | Hanna | 156/289 |
| 2,345,518 | 3/1944 | Wendel | 156/129 |
| 3,281,382 | 10/1966 | Kuester et al. | 260/23 XA |
| 3,483,062 | 12/1969 | Madge | 156/289 |
| 3,728,181 | 4/1973 | Simmons | 156/96 |
| 3,803,068 | 4/1974 | Mestetsky et al. | 156/289 |

Primary Examiner—Charles E. Van Horn
Assistant Examiner—John E. Kittle
Attorney, Agent, or Firm—F. W. Brunner; H. C. Young, Jr.

[57] ABSTRACT

A method of building rubber articles, such as a pneumatic tire, and the resulting rubber article itself. The method particularly involves the preparation of a composite of a tacky, shaped, unvulcanized rubber stock having a selected, protective film overlay loosely adhered thereto. Such composites can particularly be comprised of tread and sidewall stocks to be adhered to an unvulcanized, rubberized, fabric-reinforced carcass for the purpose of building a tire which is subsequently shaped and cured. Optionally, at least a portion of the protective film overlay can be removed from the unvulcanized, shaped rubber stock prior to building the desired rubber article.

11 Claims, No Drawings

CURED RUBBER ARTICLE AND METHOD OF PREPARATION

This invention relates to a method of building rubber articles such as a pneumatic rubber tire and to the corresponding article, or tire. The invention particularly relates to the preparation of a cured rubber tire from individually compounded, shaped rubber components.

Pneumatic rubber tires can conveniently be prepared by building previously compounded and shaped rubber components such as tread stock and sidewall stock onto a rubberized fabric carcass. The prepared tire is then shaped and cured.

An inherent difficulty involved in such tire preparation involves the storage of the individual compounded components prior to their utilization. It is important to appreciate that, once the rubber is compounded with various materials including a curative therefor, it becomes a tacky, chemically active, productive stock. Its tack attracts particles in the atmosphere, such as dirt, lint and grit. Its chemical activity can be detrimentally affected by atmospheric conditions, such as the action of oxygen, ozone and chemical contaminants. These adverse conditions can affect both the balance of compounding of the productive stock as well as its ability to adhere to itself and the basic tire carcass. As a result, the potential of producing a defective tire is substantially increased.

Conventionally, the compounded, shaped stock, such as tread stock, is simply protected from atmospheric conditions by a thin covering or overlay of a polyethylene or plasticized poly(vinyl chloride) film. Immediately prior to use, the film overlay is removed.

However, it should be pointed out that such film overwraps are desirably required to be as thin as reasonably possible in order to reduce its cost, since it is normally discarded after use. Therefore, because the flm is thin, film rupture is many times commonplace, leaving bits and pieces of the film adhered to the tacky compounded stock. When these pieces of film remain adhered to the stock during the tire building and eventually the curing process, defective tires can easily result. This can be especially troublesome if pieces of the film stick in the tread splice area or between compounded stock and a rubberized fabric ply. Since the film does not cure with the rubber during the curing process, and uncured defects thereby occur, early tire failure is enhanced.

Therefore, it is an object of this inventon to provide a method of building a rubber article, particularly a pneumatic rubber tire, from compounded rubber components, while minimizing the degradative effects of atmospheric conditions relative to the compounded stock and further minimizing the degradative effects of an adherent, protective film overlay on the compounded stock itself.

In accordance with this invention, a composite of a compounded, productive, tacky, shaped, unvulcanized rubber stock containing a curative therefor is provided having a protective film overlay loosely adhered thereto, where said film overlay is an unvulcanized composite compatible with said rubber stock having a thickness of about 0.5 to about 10 mils comprised of an unvulcanized thermoelastic block copolymer selected from the group consisting of ABA and ABC block copolymers in which A represents a nonelastomeric monovinyl aromatic hydrocarbon polymer block selected from at least one of styrene, alpha methyl styrene and vinyl toluene having an average molecular weight in the range of about 7,000 to about 25,000 and a glass transition temperature above about 25° C., the total block A content being about 20 to about 70 weight percent of the ABA copolymer, B is an elastomeric conjugated diene polymer block selected from at least one of 1,3-butadiene, isoprene and piperylene having an average molecular weight of about 30,000 to about 100,000 and a glass transition temperature below about 10° C., and C is a polar polymer block derived from vinyl pyridine, vinyl quinoline, acrylic, vinyl nitrile, vinyl furan and vinyl carbazole monomers, where the total A plus C block content is about 20 to about 70 weight percent of the total ABC copolymer.

Preferably said adherent film overlay is comprised of an admixture of (1) about 80 to about 45 weight percent of said non-productive unvulcanized thermoelastic block copolymer and correspondingly, (2) about 20 to 55 weight percent of at least one thermoplastic aromatic group containing resin selected from at least one polymer of styrene, $\alpha$-methyl styrene, styrene/$\alpha$-methyl styrene, vinyl toluene, vinyl toluene/$\alpha$-methyl styrene, indene resins, alkyl phenolic resins, and petroleum and coal tar resins, said resins characterized by being soluble in styrene and by having an intrinsic viscosity in toluene at 30° C. of about 0.02 to about 0.5.

In further accordance with this invention, it has been discovered that a method of building a rubber article comprises the steps of (A) compounding and shaping a productive tacky unvulcanized rubber stock, (B) loosely adhering to said shaped productive rubber stock a protective film overlay having a thickness in the range of about 0.05 to about 10 mils and comprised of said nonproductive unvulcanized thermoelastic block copolymer, where said thermoelastic block copolymer is preferably an admixture with said thermoplastic aromatic group-containing resin, (C) storing said compounded rubber stock with its protective adherent film overlay, (D) optionally removing at least a portion and preferably all of said protective film overlay from the compounded productive stock; (E) building a composite by adhering said compounded shaped stock onto at least one other compounded, productive unvulcanized rubber and (F) curing said composite.

The practice of this invention is particularly advantageous for the building of a pneumatic tire where non-fabric reinforced, compounded, tacky, productive shaped rubber stocks, such as tread stock, sidewall, breaker strip, coverstrip and chafer stock are built onto a compounded, productive, unvulcanized, rubberized fabric reinforced carcass and the resulting composite shaped and cured. The actual tire fabrication, shaping and curing would be essentially by conventional means to yield a toroidal pneumatic rubber tire with a basic carcass (generally fabric reinforced), a ground contacting tread portion, sidewalls and spaced beads.

In the description of this invention, compounded, productive rubber is rubber compounded with various ingredients which particularly include a curative for the rubber, such as a sulfur or peroxide, preferably a sulfur curative. Correspondingly, a non-productive rubber is a rubber which has not been compounded with a curative therefor, although it might have been compounded with other additives.

It is understood that such film composite overlay desirably contains various typical antiblocking agents, lubricants, fillers, pigments and stabilizers.

The elastomeric block copolymers useful in the practice of this invention are preferably of the ABA type which, in turn, can be of either the radial-type or of the linear type. Generally, styrene-butadiene-styrene block copolymer is desired.

In general, the radial-type ABA block copolymers are prepared by coupling AB block polymers with polyfunctional agents as described in U.S. Pat. No. 3,281,382.

In general, the linear block copolymer ABA type is prepared by any of the methods commonly used for block copolymers of styrene and butadiene; for example (1) by first preparing "living" polystyryl lithium from styrene and an alkyl lithium and adding this to a mixture of styrene-butadiene, (2) by mixing either lithium metal or a dilithium alkyl (e.g., tetramethylene dilithium), both of which are reported to grow at both ends, (3) by preparing polystyryl lithium and sequentially polymerizing butadiene and then styrene, or (4) polymerizing butadiene with polystyryl lithium and coupling with coupling agents known to those skilled in this art.

The thermoplastic aromatic resins useful in the practice of this invention are aromatic resins desirably selected from styrene, $\alpha$-methylstyrene, $\alpha$-methylstyrene/vinyl toluene, $\alpha$-methylstyrene/styrene, vinyl toluene, indenes, modified phenolics and resins from petroleum and coal-derived monomers, characterized by having an intrinsic viscosity in toluene at 30° C. of about 0.02 to about 0.5.

In general, the aromatic resins are prepared by conventional polymerization techniques, well known to those skilled in the art.

The film composite itself is prepared by (a) dissolving the block polymer, resin, protective agents, and performance additives in a suitable solvent, (b) casting the resultant cement onto a suitable substrate, (c) drying the film, and (d) removing the film from the substrate. The film composite can also be prepared by using melt processing techniques (extrusion and calendering).

Unvulcanized, compounded rubber stocks can be advantageously protected by the film overlay according to this invention. Representative of the various unvulcanized rubbers are natural rubber, synthetic cis-1,4-polyisoprene, rubbery polymers of 1,3-butadiene, butadiene-styrene emulsion or solution formed rubbery copolymers and copolymers of butadiene and acrylonitrile. All of these heretofore identified rubbers are of the high unsaturation type. Namely, they contain an appreciable amount of carbon-to-carbon double bonds therein. Although this invention is particularly directed to the protection of the high unsaturation-type compounded rubbers, the low unsaturation type can also be protected if desired. Representative of such low unsaturation compounded rubbers are butyl rubber, which is typically a copolymer containing a major amount of isobutylene and a minor amount of isoprene, as well as the various ethylene/propylene copolymers and rubbery terpolymers of ethylene/propylene and a minor amount of conjugated diene.

Various rubber compounding ingredients can be used to compound the rubber stock. Representative of the various compounding ingredients are fillers, such as clay, silicates, calcium carbonate and the like; accelerators, such as, for example, cadmium diethyldithiocarbamate, tetramethyl thiuram disulfide, benzothiazyl disulfide and the like; antioxidants, such as the well known substituted phenolic, substituted thio esters and amine type; antiozonants, such as aniline derivatives, diamines and thioureas; curatives, such as sulfur, sulfur providing compounds and peroxides; ultraviolet agents such as substituted benzotriazoles and substituted benzophenones; color pigments, such as iron oxide, titanium dioxides and organic dyes; reinforcing pigments, such as carbon black, zinc oxide and hydrated silicon compounds; and processing aids, such as polyethylenes, silicon dioxide, pumice and stearate.

In order for the film to be useful as an overlay film composite for protecting unvulcanized compounded rubber, it is generally necessary to mix with the composite an anti-block agent to prevent the film from sticking to itself. This additive is particularly required where the protected materials are stacked or "containerized" together in order to prevent them from sticking to each other and making them virtually impossible to separate without actually destroying portions of the protected article. For this purpose, various well-known anti-block agents can be used, representative of which are fatty acid amides, silicones, soaps, waxes, pigments, vegetable lecithins, etc.

The practice of this invention is further illustrated by reference to the following examples which are intended to be representative rather than restrictive of the scope of the invention. Unless otherwise indicated, all parts andpercentages are by weight.

EXAMPLE I

A thermoplastic film composition consisting of 100 parts by weight of an unvulcanized elastomeric styrene-butadiene-styrene block polymer (SBS) blended with 100 parts by weight thermoplastic $\alpha$-methyl styrene polymer. In the block copolymer, said polystyrene block is a thermoplastic polymer portion having a molecular weight in the range of about 10,000 to about 15,000 and where said diene polymer porton is a rubbery polybutadiene block having a molecular weight in the range of about 60,000 to about 70,000 and further characterized by having a melt viscosity of less than 1 gram/10 minutes according to ASTM No. 1238 and containing about 30 parts by weight polystyrene block and correspondingly about 70 parts by weight polybutadiene block. Said $\alpha$-methyl styrene resin is characterized by having an intrisic viscosity in toluene at 30° C. of about 0.13. A small amount of modifiers, antiblock agents and stabilizers were included in the blend. The composite or blend itself was prepared by dissolving the ingredients in tetrahydrofuran at a temperature of about 50° C. The mixture was then cast, dried and removed from the casting surface to yield a 1 mil film.

A test to evaluate block, or the tendency of the film to stick to itself, was run by placing two film samples together, face-to-face, so that a 2-inch by 2-inch, two-ply specimen was obtained. The specimen was placed between two metal plates in a horizontal position and a 1.6 pound per square inch pressure was placed on top of the upper plate. The assembly was placed in a static hot air oven at about 77° C. for about 24 hours. At the end of this time, the film was tested for resistance to blocking by measuring the force in grams to separate the films by pulling them apart at about a 90° angle at a rate of about 20 inches per minute.

Block test results favorably indicated that less than 10 grams of force was required to separate the two plies of film.

In addition, physical property tests were conducted to determine structural integrity of the film, results of which are shown in the following Table 1.

PHYSICAL PROPERTIES OF SBS AND SOME SBS/RESIN BLENDS

| Properties | Linear SBS (30% styrene) + no resin | Linear SBS (30% styrene) + 75 phr resin | Linear SBS (30% styrene) + 100 phr resin | Radial SBS (30% styrene) + no resin | Radial SBS (30% styrene) + 75 phr resin |
|---|---|---|---|---|---|
| Gauge (mils) | 1.2 | 1.1 | 1.3 | 1.0 | 1.0 |
| Tensile yield (psi) | 330 | 670 | 750 | 255 | 375 |
| 100% Modulus (psi) | 260 | 580 | 640 | 290 | 410 |
| 300% Modulus (psi) | 280 | 755 | 970 | 410 | 1460 |
| 500% Modulus (psi) | 425 | 1810 | 1940 | 875 | 2750 |
| Ultimate Tensile (psi) | 3000 | 2750 | 2150 | 2950 | 2960 |
| Elongation (%) | 820 | 645 | 580 | 705 | 525 |
| Elmendorf Tear (gms/mil) | 115 | 653 | 818 | 97 | 410 |

The resin used was α-methyl styrene resin having 0.13 intrinsic viscosity in toluene at 30° C.

The tensile strength (pounds per square inch) and elongation were determined by ordinary rubber testing techniques. The Elmendorf tear is a measure of the tear resistance of the film in grams force at 90° per mil thickness to cause the tear.

Note that with the thermoplastic resin addition, all of the tensile yield, modulus, and Elmendorf tear values increased although the elongation decreased.

EXAMPLE II

A tacky, compounded rubber tire tread stock, containing a curative therefor, was sheeted off a rubber mill at a thickness of about 0.05 inch for the purpose of preparing specimens for evaluation. A 4 inch × 6 inch template was used to cut two 0.05 inch thick tread stock samples and one approximately 0.001 inch thick unvulcanized SBS block copolymer film sample to prepare laminates for teasting purposes. The film was of the type prepared according to Example I.

Laminates were then prepared of tread stock/film/tread stock with a 1-½ inch × 4 inch Teflon (TFE) strip (a trademark of E. I. du Pont de Nemours and Company) across the width of the laminate. The laminate was cured in a press for about 12 minutes at about 160° C. under standard pressure. The specimen, or laminate, was immediately removed from the press and permitted to cool to about room temperature (about 25° C.) for evaluation.

Each test specimen, or laminate, was carefully inspected for voids including blisters and separations. Then a effort was made to separate tread stock plies at the film/tread stock interface. All of the specimens adhered tightly and could not be separated except by actual tearing of the sample itself.

Similarly, laminates were prepared where the film was a plasticized poly(vinyl chloride) or polyethylene material and evaluated in a similar manner. All of these laminates separated at the film/tread stock interface.

In this example, a typical tread rubber stock could be prepared from the following recipe shown in Table 1.

Table 1

| Compound | Parts |
|---|---|
| Butadiene/styrene rubber copolymer* | 225 |
| Mixture of oil soluble sulfonic acid of high molecular weight and a paraffinic oil | 1.5 |
| Petroleum residue (resin) | 10 |
| Zinc oxide | 3 |
| Stearic acid | 1.5 |
| Resin | 1.5 |
| Sulfur | 2.3 |
| Antioxidant | 1.7 |
| TOTAL | 246.5 |

*Butadiene/styrene rubber composite having a Mooney(ML-4 of about 48) comprised of about 24 percentbound styrene, 75 phr carbon black and 50 phraromatic oil Similarly, laminates can be prepared by substituting for the tread stock, shaped, tacky, compounded sidewall rubber and rubberized, fabric-reinforced tire carcass stock ply. Evaluations of such laminates would be substantially the same as that obtained from the tread stock/film/tread stock laminate evaluation of this example.

In the description of this invention, reference is made to productive rubber stocks and to non-productive thermoelastic block copolymers. For clarification, a rubber stock is normally referred to as being productive when it has been compounded with various ingredients, which include a curative therefor. Therefore, the productive rubber stock is chemically active in the sense that it is ready to undergo a curing transformation. Conversely, a non-productive rubber as used herein is intended to relate to a rubber which has not been compounded with a curative therefor and thus, is not ready to undergo a curing transformation utilizing a curative contained within its own composition. If it cures at all, it needs the aid of an outside curing agent, such as that which might be provided by a productive rubber stock to which it is adhered.

In the further description of this invention, it has been related that the productive overlay be loosely adhered to the tacky, shaped unvulcanized rubber stock. In this sense, the overlay is loosely adhered so that it can be reasonably removed without excessive tearing, although it is anticipated that especially thin films of the overlay would tear with bits and pieces of the film itself remaining adhered to the protective rubber stock.

It has been indicated herein that after storage of the composite of productive rubber and loosely adhered productive overlay optionally at least a portion of the overlay is removed. Therefore, it is intended that the operator has the option of (1) removing none of the overlay, therefore, leaving it adhered to the productive rubber stock during the shaping and curing process to be cured with the final product, (2) removing only a portion of the overlay, the remaining adhered portion either being by purposeful design or because a portion of the overlay is torn from the original film as it is removed, the remaining adhered portion undergoing the following shaping and curing step or (3) entirely removing the overlay, where the original intended purpose of applying the overlay was for protective reasons only.

In the description of this invention, particular attention has been given to rubber stocks used for the preparation of pneumatic tires. In this regard, it is particularly preferred to apply this invention to composites of shaped, unvulcanized thread and sidewall stocks with the protective thermoelastic film overlay adhered thereto.

With regard to the production of rubber stocks, generally it should be pointed out that it is especially preferred that the protection overlay be an ABA block copolymer especially a styrene/butadiene/styrene (SBS) block copolymer.

While certain representative embodiments and details have been shown for the purpose of illustrating the invention, it will be apparent to those skilled in this art that various changes and modifications may be made therein without departing from the spirit or scope of the invention.

What is claimed is:

1. A composite of a compounded, productive, tacky, shaped, unvulcanized rubber stock containing a curative therefor having a protective film overlay loosely adhered thereto, where said film overlay is an unvulcanized composite compatible with said compounded rubber stock having a thickness in the range of about 0.5 to about 10 mils comprised of an unvulcanized thermoelastic block copolymer selected from the group consisting of ABA and ABC block copolymers in which A represents a non-elastomeric monovinyl aromatic hydrocarbon polymer block selected from at least one of styrene, alpha methyl styrene and vinyl toluene having an average molecular weight in the range of about 7,000 to about 25,000 and a glass transition temperature above about 25° C., the total block A content being about 20 to about 70 weight percent of the ABA copolymer, B is an elastomeric conjugated diene polymer block selected from at least one of 1,3-butadiene, isoprene and piperylene having an average molecular weight of about 30,000 to about 100,000 and a glass transition temperature below about 10° C., and C is a polar polymer block derived from vinyl pyridine, vinyl quinoline, acrylic, vinyl nitrile, vinyl furan and vinyl carbazole monomers, where the total A plus C block content is about 20 to about 70 weight percent of the total ABC copolymer.

2. The composite of claim 1 where said adherent film overlay is comprised of an admixture of (1) about 80 to about 45 weight percent of said non-productive unvulcanized thermoelastic block copolymer and correspondingly, (2) about 20 to 55 weight percent of at least one thermoplastic aromatic group-containing resin selected from at least one polymer of styrene, α-methyl styrene, styrene/α-methyl styrene, vinyl toluene, vinyl toluene/α-methyl styrene, indene resins, alkyl phenolic resins, and petroleum and coal tar resins, said resins characterized by being soluble in styrene and by having an intrinsic viscosity in toluene at 30° C. of about 0.02 to about 0.5.

3. A method of producing a rubber article which comprises the steps of (A) compounding and shaping a productive, tacky, unvulcanized, rubber stock containing a curative therefor, (B) forming a composite by loosely adhering to said shaped productive rubber stock a protective film overlay of claim 1 having a thickness in the range of about 0.5 to about 10 mils and comprised of said non-productive unvulcanized thermoelastic block copolymer, (C) storing said composite of compounded rubber stock with its protective, non-productive, adherent film overlay, (D) optionally removing at least a portion of said protective film overlay from the compounded productive stock (E) building an additional composite by adhering said compounded shaped stock onto at least one other compounded, productive, unvulcanized rubber containing a curative therefor, and (F) curing said additional composite.

4. The method of claim 3 where said rubber article is a toroidal shaped pneumatic rubber tire comprised of a basic fabric reinforced carcass, ground contacting tread portion, and sidewalls prepared by the method which comprises (A) compounding and shaping at least one non-fabric reinforced productive tacky unvulcanized rubber stock selected from tread, sidewall, breaker strip, cover strip and chafer stocks, (B) forming a composite by loosely adhering to said shaped, productive stock said protective film overlay, (C) storing said composite, (D) optionally removing at least a portion of said protective film overlay from said productive stock, (E) building an additional composite by adhering said productive shaped stock onto a compounded, productive, unvulcanized rubberized fabric-reinforced carcass, and (F) shaping and curing said additional composite.

5. The composite of claim 1 where said curative is a sulfur curative.

6. The composite of claim 1 where said compounded rubber is a high unsaturation rubber.

7. A cured rubber article prepared by the method of claim 3 where at least a portion of said protective overlay remained adhered to the shaped rubber stock.

8. A pneumatic rubber tire prepared by the method of claim 4 where at least a portion of said protective overlay remained adhered to the shaped rubber stock.

9. The pneumatic rubber tire according to claim 8 where, in its preparation, said film overlay is comprised of an admixture of (1) about 80 to about 45 weight percent of said non-productive unvulcanized thermoelastic block copolymer and correspondingly, (2) about 20 to 55 weight percent of at least one thermoplastic aromatic group-containing resin selected from at least one polymer of styrene, α-methyl styrene, styrene/α-methyl styrene, vinyl toluene, vinyl toluene/α-methyl styrene, indene resins, alkyl phenolic resins, and petroleum and coal tar resins, said resins characterized by being soluble in styrene and by having an intrinsic viscosity in toluene at 30° C. of about 0.02 to about 0.5.

10. The pneumatic rubber tire of claim 9 where, in its preparation, said protective film overlay composite is comprised of a styrene/butadiene/styrene block copolymer and where said unvulcanized, compound rubber stock is comprised of at least one rubber selected from natural rubber, synthetic cis 1,4-polyisoprene, rubbery polymers of 1,3-butadiene, butadiene/styrene emulsion or solution formed rubber polymers, butadiene/acrylonitrile copolymers, butyl rubber, ethylene/propylene copolymers, rubbery terpolymers of ethylene/propylene and a minor amount of conjugated diene, and where said productive unvulcanized rubber stock contains a sulfur curative therefor.

11. The penumatic rubber tire of claim 10 where, in its preparation, said shaped, productive rubber stocks are selected from at least one of tread and sidewall stocks and where at least a portion of said adherent protective film overlay is removed from said shaped rubber stocks prior to building said additional composite by adhering said shaped stock onto a compounded, unvulcanized rubberized fabric-reinforced tire carcass.

* * * * *